United States Patent [19]
Wolf

[11] Patent Number: 5,504,781
[45] Date of Patent: Apr. 2, 1996

[54] PROCESS FOR THE RECOVERY OF DATA TRANSMITTED OVER A TRANSMISSION PATH FOR DIGITAL DATA STREAMS USING DECODING BY CROSS-CORRELATION OF A DATA SEQUENCE CODED BY CYCLIC SHIFTING AND INVERSION

[75] Inventor: Andreas Wolf, Berlin, Germany

[73] Assignee: Siemens Aktiengesellschaft, Munich, Germany

[21] Appl. No.: 284,402

[22] PCT Filed: Jan. 26, 1993

[86] PCT No.: PCT/DE93/00082

§ 371 Date: Aug. 1, 1994

§ 102(e) Date: Aug. 1, 1994

[87] PCT Pub. No.: WO93/15574

PCT Pub. Date: Aug. 5, 1993

[30]     Foreign Application Priority Data

Jan. 31, 1992 [DE] Germany .................. 42 03 301.2

[51] Int. Cl.⁶ .................. H04B 14/04; H04B 15/00; H04L 27/00
[52] U.S. Cl. .................. 375/242; 375/241; 341/173; 371/49.2; 342/189
[58] Field of Search .................. 375/343, 284, 375/377, 295, 259, 316, 340, 285, 241, 242; 370/18, 107; 364/728.03, 724.11, 724.12, 819, 728; 371/49.2; 341/20, 173

[56]     References Cited

U.S. PATENT DOCUMENTS

| 4,833,470 | 5/1989 | Iketani ............................ 341/59 |
| 5,025,455 | 6/1991 | Nguyen ........................ 375/327 |

OTHER PUBLICATIONS

H. W. Atweiler, et al., "Bitfehler–Strukturanalyse in der Breitband–ISDN– Messtechnik," *Messtechnik*, vol. 44, No. 8, pp. 548–557 (1991).
A. Wolf, "Messpräzision auf breitem Band," *Telecom Report*, vol. 14, No. 2, pp. 104–107 (Mar./Apr. 1991).

*Primary Examiner*—Young T. Tse
*Assistant Examiner*—William Luther
*Attorney, Agent, or Firm*—Kenyon & Kenyon

[57]     ABSTRACT

A process for recovering, at the reception end, data transmitted over a transmission path for digital data streams. A code-word generator for generating a binary code word producing a Dirac pulse is provided. The binary code word is cyclically shifted to create further binary code words. The binary code word and further binary code words are inverted to create still further binary code words. The data is coded, on the transmission end of the transmission path, with the binary code word, with the further binary code words, and with the still further binary code words. On the reception end of the transmission path, the data is recovered by cross-correlating the data and by utilizing the position of the main maximum of the cross-correlation functions. To increase the number of code words, a second code-word generator and a third codeword generator, having different generator polynomials, are used for coding binary code words, further binary code words, and still further binary code words, by cyclical shifting and inversion in a manner similar to that above. On the reception end of the transmission path, second and third cross-correlators are additionally used. The main maximum of each of the resulting three cross-correlation functions is detected and the data word transmitted is recovered based on a main maximum with a value above a predetermined value and from the position of this main maximum.

6 Claims, 6 Drawing Sheets

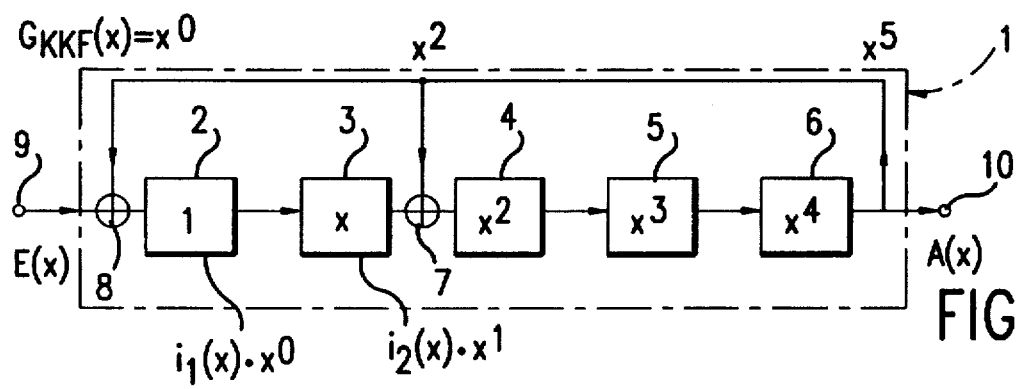

FIG. 1

| | $i_1$ | $i_2$ | $i_3$ | $i_4$ | $i_5$ |
|---|---|---|---|---|---|
| $x^0$ MOD $G_{KKF}(X)$ | 1 | 0 | 0 | 0 | 0 |
| $x^1$ MOD $G_{KKF}(X)$ | 0 | 1 | 0 | 0 | 0 |
| $x^2$ MOD $G_{KKF}(X)$ | 0 | 0 | 1 | 0 | 0 |
| $x^3$ MOD $G_{KKF}(X)$ | 0 | 0 | 0 | 1 | 0 |
| $x^4$ MOD $G_{KKF}(X)$ | 0 | 0 | 0 | 0 | 1 |
| $x^5$ MOD $G_{KKF}(X)$ | 1 | 0 | 1 | 0 | 0 |
| $x^6$ MOD $G_{KKF}(X)$ | 0 | 1 | 0 | 1 | 0 |
| $x^7$ MOD $G_{KKF}(X)$ | 0 | 0 | 1 | 0 | 1 |
| $x^8$ MOD $G_{KKF}(X)$ | 1 | 0 | 1 | 1 | 0 |
| $x^9$ MOD $G_{KKF}(X)$ | 0 | 1 | 0 | 1 | 1 |
| $x^{10}$ MOD $G_{KKF}(X)$ | 1 | 0 | 0 | 0 | 1 |
| $x^{11}$ MOD $G_{KKF}(X)$ | 1 | 1 | 1 | 0 | 0 |
| $x^{12}$ MOD $G_{KKF}(X)$ | 0 | 1 | 1 | 1 | 0 |
| $x^{13}$ MOD $G_{KKF}(X)$ | 0 | 0 | 1 | 1 | 1 |
| $x^{14}$ MOD $G_{KKF}(X)$ | 1 | 0 | 1 | 1 | 1 |
| $x^{15}$ MOD $G_{KKF}(X)$ | 1 | 1 | 1 | 1 | 1 |
| $x^{16}$ MOD $G_{KKF}(X)$ | 1 | 1 | 0 | 1 | 1 |
| $x^{17}$ MOD $G_{KKF}(X)$ | 1 | 1 | 0 | 0 | 1 |
| $x^{18}$ MOD $G_{KKF}(X)$ | 1 | 1 | 0 | 0 | 0 |
| $x^{19}$ MOD $G_{KKF}(X)$ | 0 | 1 | 1 | 0 | 0 |
| $x^{20}$ MOD $G_{KKF}(X)$ | 0 | 0 | 1 | 1 | 0 |
| $x^{21}$ MOD $G_{KKF}(X)$ | 0 | 0 | 0 | 1 | 1 |
| $x^{22}$ MOD $G_{KKF}(X)$ | 1 | 0 | 1 | 0 | 1 |
| $x^{23}$ MOD $G_{KKF}(X)$ | 1 | 1 | 1 | 1 | 0 |
| $x^{24}$ MOD $G_{KKF}(X)$ | 0 | 1 | 1 | 1 | 1 |
| $x^{25}$ MOD $G_{KKF}(X)$ | 1 | 0 | 0 | 1 | 1 |
| $x^{26}$ MOD $G_{KKF}(X)$ | 1 | 1 | 1 | 0 | 1 |
| $x^{27}$ MOD $G_{KKF}(X)$ | 1 | 1 | 0 | 1 | 0 |
| $x^{28}$ MOD $G_{KKF}(X)$ | 0 | 1 | 1 | 0 | 1 |
| $x^{29}$ MOD $G_{KKF}(X)$ | 1 | 0 | 0 | 1 | 0 |
| $x^{30}$ MOD $G_{KKF}(X)$ | 0 | 1 | 0 | 0 | 1 |
| $x^{31}$ MOD $G_{KKF}(X)$ | 1 | 0 | 0 | 0 | $0 = x^0$ |

FIG. 2

| s | C(x) | | | |
|---|---|---|---|---|
| 0 | 00001 | 00101100 | 11111000 | 1101110101 |
| 1 | 10000 | 10010110 | 01111100 | 0110111010 |
| 2 | 01000 | 01001011 | 00111110 | 0011011101 |
| 3 | 10100 | 00100101 | 10011111 | 0001101110 |
| 4 | 01010 | 00010010 | 11001111 | 1000110111 |
| 5 | 10101 | 00001001 | 01100111 | 1100011011 |
| 6 | 11010 | 10000100 | 10110011 | 1110001101 |
| 7 | 11101 | 01000010 | 01011001 | 1111000110 |
| 8 | 01110 | 10100001 | 00101100 | 1111100011 |
| 9 | 10111 | 01010000 | 10010110 | 0111110001 |
| 10 | 11011 | 10101000 | 01001011 | 0011111000 |
| 11 | 01101 | 11010100 | 00100101 | 1001111100 |
| 12 | 00110 | 01110101 | 00001001 | 0110011111 |
| 13 | 00011 | 01110101 | 00001001 | 0110011111 |
| 14 | 10001 | 10111010 | 10000100 | 1011001111 |
| 15 | 11000 | 11011101 | 01000010 | 0101100111 |
| 16 | 11100 | 01101110 | 10100001 | 0010110011 |
| 17 | 11110 | 00110111 | 01010000 | 1001011001 |
| 18 | 11111 | 00011011 | 10101000 | 0100101100 |
| 19 | 01111 | 10001101 | 11010100 | 0010010110 |
| 20 | 00111 | 11000110 | 11101010 | 0001001011 |
| 21 | 10011 | 11100011 | 01110101 | 0000100101 |
| 22 | 11001 | 11110001 | 10111010 | 1000010010 |
| 23 | 01100 | 11111000 | 11011101 | 0100001001 |
| 24 | 10110 | 01111100 | 01101110 | 1010000100 |
| 25 | 01011 | 00111110 | 00110111 | 0101000010 |
| 26 | 00101 | 10011111 | 00011011 | 1010100001 |
| 27 | 10010 | 11001111 | 10001101 | 1101010000 |
| 28 | 01001 | 01100111 | 11000110 | 1110101000 |
| 29 | 00100 | 10110011 | 11100011 | 0111010100 |
| 30 | 00010 | 01011001 | 11110001 | 1011101010 |

FIG.3

| $d_7$ [$x^6$] | $d_6$ [$x^5$] | $d_5$ [$x^4$] | $d_4$ [$x^3$] | $d_3$ [$x^2$] | $d_2$ [$x^1$] | $d_1$ [$x^0$] | GENERATOR POLYNOMIAL $G_x(x)$; ADDITION | INVERTED |
|---|---|---|---|---|---|---|---|---|
| 0 | 0 | 0 | 0 | 0 | 0 | 0 | $G_3(x)$; a | NO |
| 0 | 1 | 0 | 0 | 0 | 0 | 0 | $G_3(x)$; b | YES |
| 0 | 0 | b | b | b | b | b | $G_1(x)$ | NO |
| 0 | 1 | b | b | b | b | b | $G_1(x)$ | YES |
| 1 | 0 | 0 | 0 | 0 | 0 | 0 | $G_3(x)$; c | NO |
| 1 | 1 | 0 | 0 | 0 | 0 | 0 | $G_3(x)$; d | YES |
| 1 | 0 | b | b | b | b | b | $G_2(x)$ | NO |
| 1 | 1 | b | b | b | b | b | $G_2(x)$ | YES |

$D_k(x)$

PROCESS FOR THE RECOVERY OF DATA TRANSMITTED OVER A TRANSMISSION PATH FOR DIGITAL DATA STREAMS USING DECODING BY CROSS-CORRELATION OF A DATA SEQUENCE CODED BY CYCLIC SHIFTING AND INVERSION

BACKGROUND OF THE INVENTION

The present invention relates to a process for recovering, at a reception end of a transmission path for digital data streams, data transmitted over the transmission path from a transmission end to the reception end.

In the present invention, various data are coded at the transmission end of the transmission path by means of a binary code word. The binary code word is generated by a code-word generator. The auto-correlation of the binary code word produces a Dirac Pulse. The various data at the transmission end of the transmission path are also coded with further binary code words produced by cyclically shifting the code word and by inverting the code word and further code words.

Further, in the present invention, the code word received is cross-correlated at the reception end of the transmission path by means of a cross-correlator to decode the code word. The relative position and the sign of the main maximum of the corresponding cross-correlation function is used to recover the data sent over the transmission path.

In a known process of this type ("telcom report" 14 (1991), No. 2, pages 104 to 107), a $2^5$-m sequence is used as binary code word. This $2^5$-m sequence has the property that the auto-correlation of this $2^5$-m sequence produces an ideal Dirac impulse. From the $2^5$-m sequence, further binary code words are produced by cyclically shifting the binary code word. These further binary code words are characterized by phases which differ from each other. In this way, 31 different data words can be coded on the transmission end, and thus 4-bit data words can be coded. 5-bit data words cannot be coded since only 31 code words are available. One embodiment of the known process, which constitutes an improvement with respect to the number of codable data words, uses inverted binary $2^5$-m sequences on the transmission end in addition to the coding. In this way, coding a maximum of an additional 31 different data words is possible. As a whole, 5-bit data words can thus be transmitted and recovered on the reception end of a transmission path by cross-correlation, despite disturbances on the transmission path, if not more than 7 bit errors occur upon the transmission.

The object of the present invention is to develop the above process so that a comparatively large number of data present on the transmission end can be reliably recovered on the reception end.

SUMMARY OF THE INVENTION

To achieve the above mentioned object, the present invention provides that a second supply of code words is used on the transmission end of the transmnission path, a second code word being generated by a second code-word generator. The auto-correlation of the second code word produces a Dirac pulse. Further second binary code words are produced by cyclically shifting the second code word and by inverting the second code word and further second code words to produce second inverse code words.

The second code-word generator can be defined by a generator polynomial of the same degree as the code-word generator.

The present invention further provides that a number of data are coded with data polynomials of the seventh order such that the code words of the two code-word generators are associated with data polynomials formed therefrom having, in each case, the five lowest binary places of tile seven order data polynomial as a function of two combinations of values of the two highest binary places of the seven data polynomial.

A further number of data are coded with data polynomials of the seventh order such that the inverse code words of the two code-word generators are associated with data polynomials formed therefrom having the five lowest binary places of the seven order data polynomial as a function of two further combinations of values of the two highest binary places of the seven order data polynomial. Further, an additional number of data are coded with data polynomials of the seventh degree such that code words of an additional code-word supply are associated with data polynomials which have been formed therefrom having zero at the five lowest binary places of the seven order data polynomial as a function of four combinations of values of the two highest binary places of the seven order data polynomial. The additional code-word supply is produced by a third code-word generator which corresponds to the two other code-word generators with respect to the degree of its generator polynomial and with respect to its code words.

The present invention provides that three cross-correlation functions are formed on the reception end of the transmission path by means of a cross-correlator, a second cross-correlator and a third cross-correlator, each having different correlation references. The height of the amounts of the main maxima of the cross-correlation functions are examined. If a height of the amount of a main maximum lies above a predetermined value, its relative position is determined and the datum transmitted in each case is recovered therefrom, considering also the sign of the corresponding main maximum.

One essential advantage of the process of the present invention is that more than twice as many code words are made available at the transmission end than in the known process. The number of bit errors must not exceed 5 to assure the dependable recovery of the data sent on the transmission end onto the transmission path on the reception end by cross-correlation.

In the process of the present invention, the code words of the second code supply can be formed in different manners. For example, four different code words produced by cyclically shifting the binary code word of the second code-word generator can be used. However, using two code words of the second code supply and forming the further code words therefrom by inversion is particularly advantageous.

As is also the case in the known process described above, the height of the main maximum of the cross-correlation functions can be advantageously utilized as a measure for the number of bit errors.

BRIEF DESCRIPTION OF THE DRAWINGS

FIG. 1 shows an embodiment of a shift register suitable for producing a code word for the process of the present invention.

FIG. 2 shows a binary code word.

3

FIG. 3 shows further code words obtainable by cyclically shifting of the binary code word of FIG. 2.

Figures 4, 5:
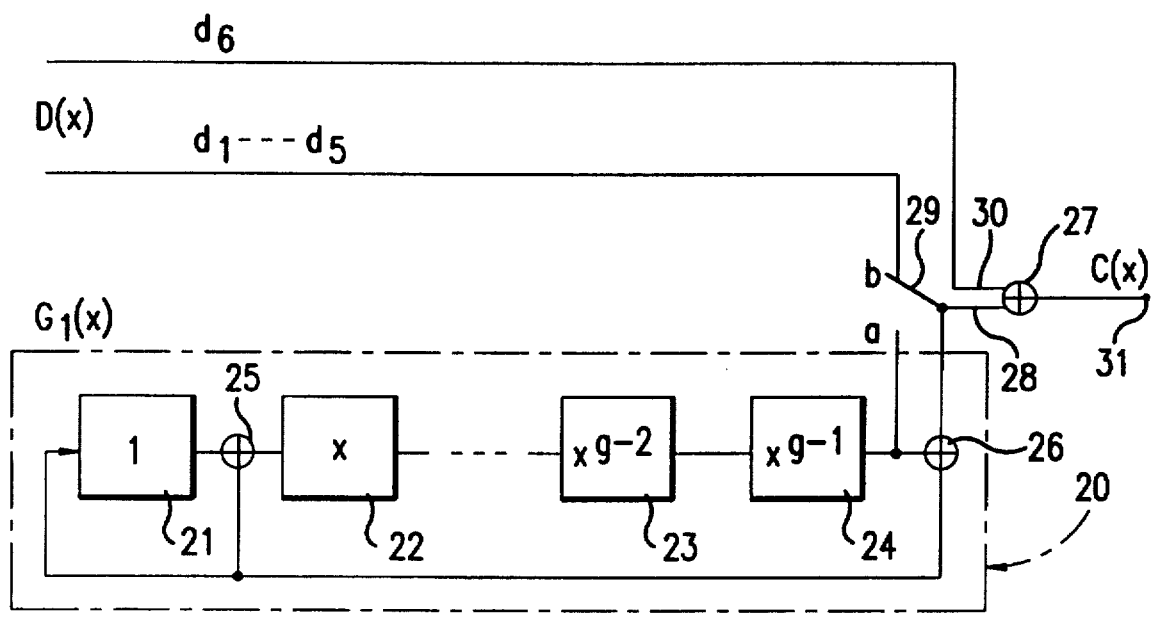

FIG. 4 shows an embodiment of a bipolar coder.

FIG. 5 is a table showing coding or decoding.

Figure 6:
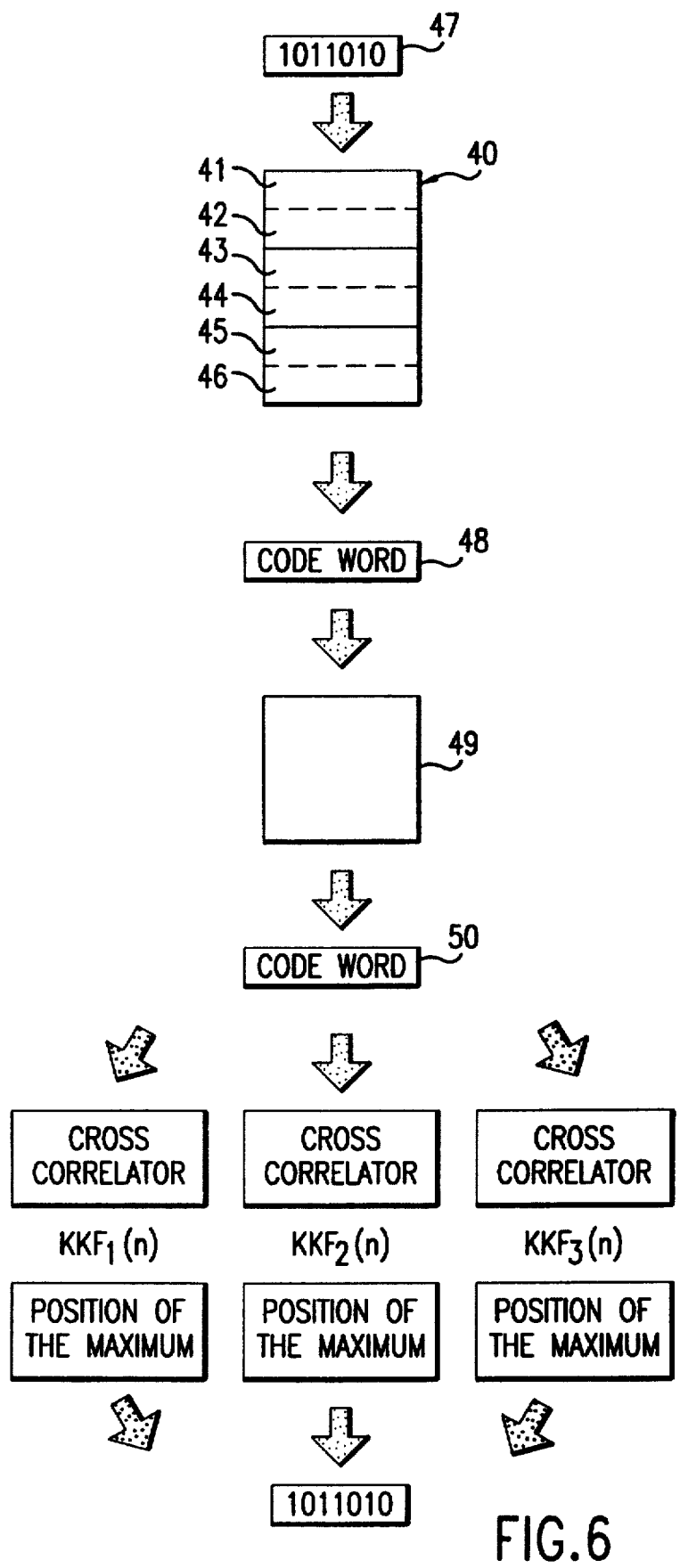

FIG. 6 is an embodiment of an arrangement for implementing the process of the present invention.

Figure 7:
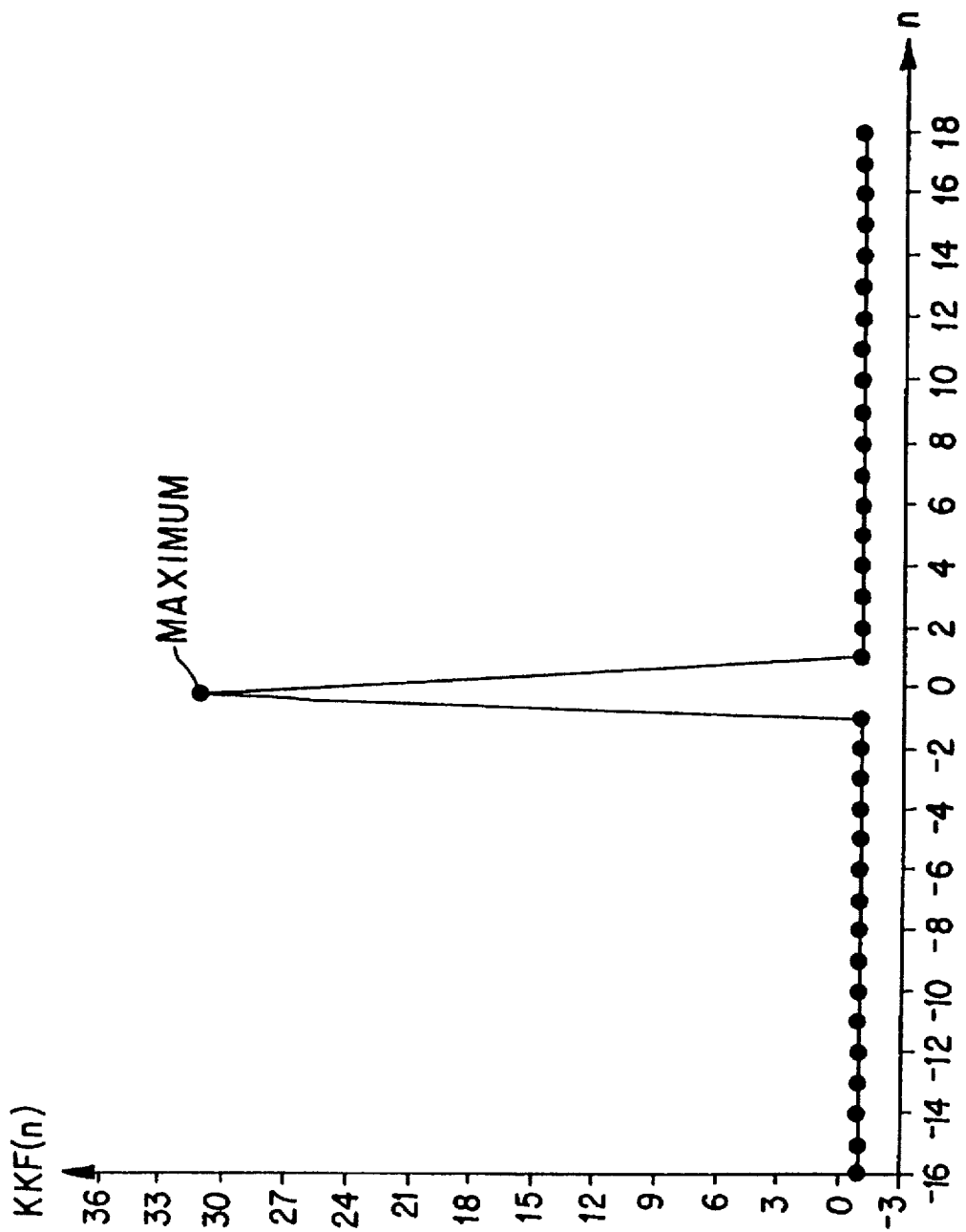

FIG. 7 shows a cross-correlation function.

Figure 8:
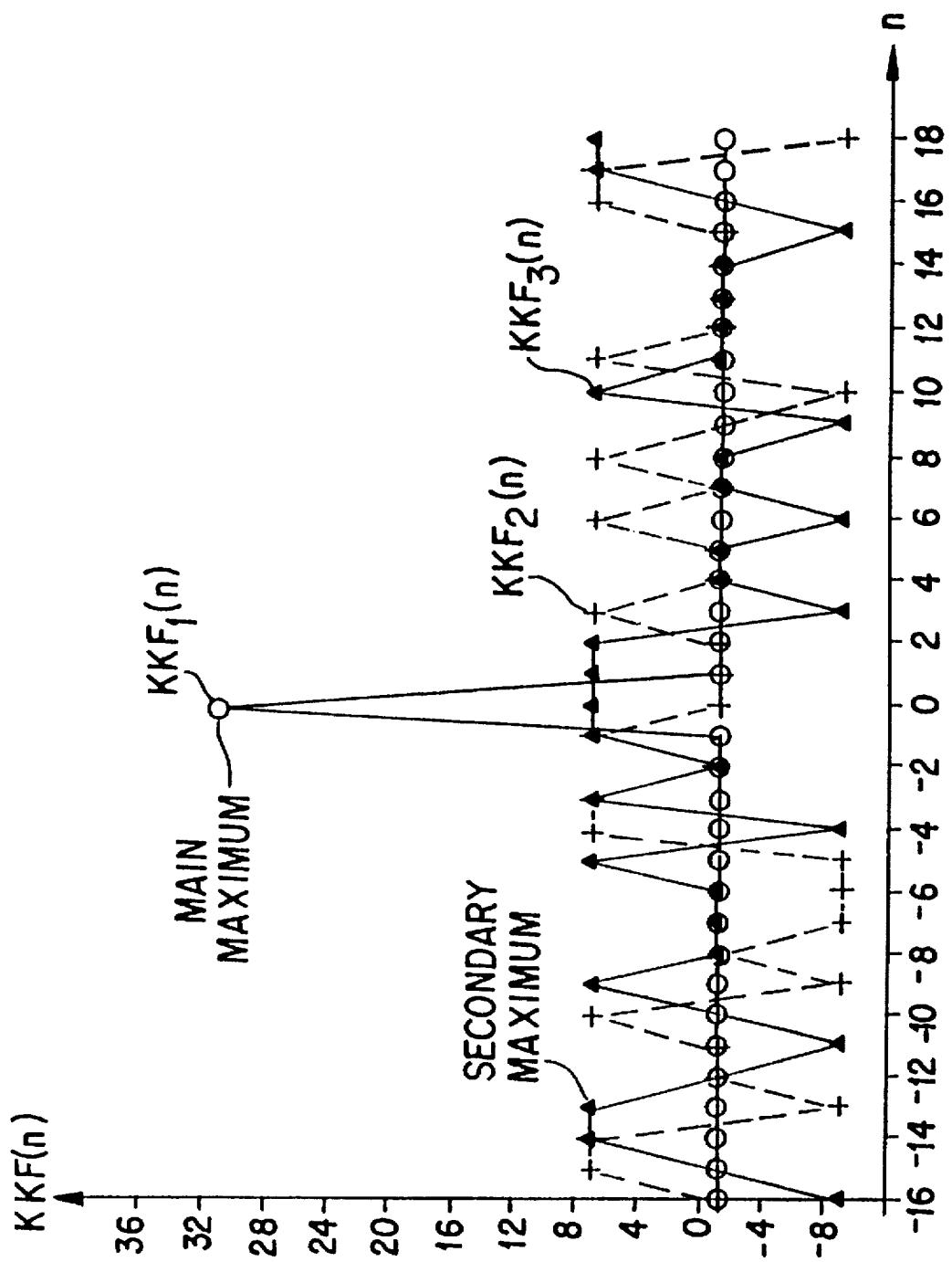

FIG. 8 shows three cross-correlation functions.

DETAILED DESCRIPTION

FIG. 1 shows a shift register 1 which contains 5 stages, 2, 3, 4, 5 and 6, each stage being a D flip-flop in the embodiment shown. The shift register 1 includes a feedback coupling from the output of stage 6 to an exclusive-OR gate 7 arranged between stages 3 and 4 and to another exclusive-OR gate 8 arranged in front of the stage 2. This feedback coupling can be described by a generator polynomial $G_{KKF}(x)$:

$$G_{KKF}(x) = x^0 + x^2 + x^5 = x^5 + x^2 + 1 \tag{1}$$

This generator polynomial $G_{KKF}(x)$ is an "irreducible" polynomial of order g=5. The period of a $2^5$-m sequence which can be produced with the generator polynomial is $2^g - 1 = 31$.

An input 9 of the shift register 1 can be provided with an input sequence $E(x)$. A binary output sequence $A(x)$ is provided at an output 10. The output signal $A(x)$ is described with the input signal $E(x)$ and the generator polynomial $G_{KKF}(x)$ by $$A(x) = E(x)/G_{KKF}(x) \tag{2}$$

The first 31 values of the output signal $A(x)$ in the case of a stimulant with an input sequence $E(x)=x^{31}$, which is a 100 00 sequence, is determined by the polynomial division $$A(x) = x^{31} : (x^5 + x^2 + 1) = (x^{26} + x^{23} + x^{21} + x^{20} + x^{17} + \tag{3}$$

$$x^{16} + x^{15} + x^{14} + x^{13} + x^9 + x^8 + x^6 + x^5 + x^4 +$$

$$x^2 + 1) + 1/(x^5 + x^2 + 1)$$

with $$\frac{1}{x^5 + x^2 + 1} = \frac{R(X)}{G_{KKF}(x)}$$

the result of which is identical to the sequence of numbers $c_O(n)$ of $2^5$-m sequency:

$$C_O(n) = \{0000100101100111110001101110101\} \tag{4}$$

the division remainder $R(x)$, which furthermore is identical to the content $I(x)$ of the five stages 2 to 6 after 31 cycles, indicates the periodic behavior of the $2^5$-m sequence generator. This sequence of numbers $c_O(n)$ is used, as will be further described below, as a code word $c_O(n)$ in the process of the invention.

If $x^{31}+1$ is selected as input signal, there is obtained $$A(x) = (x^{31} + 1) : (x^5 + x^2 + 1) = H_{KKF}(x) = (x^{26} + x^{23} + \tag{5}$$

$$x^{21} + x^{20} + x^{17} + x^{16} + x^{15} + x^{14} + x^{13} + x^9 + x^8 +$$

$$x^6 + x^5 + x^4 + x^2 + 1)$$

as output signal the polynomial $H_{KKF}(x)$ which is perpendicular to $G_{KKF}(x)$ and which represents only one period of the $2^5$-m sequence and is thus the polynomial representation of $c_O(n)$.

4

In the customary representation, the output signal of the shift register can be obtained from the table in FIG. 2, which has been compiled considering the fact that the contents of the individual stages 2 to 6 of the shift register of FIG. 1 can be described by the polynomial $I(x)$, namely:

$$I(x) = x^4 \cdot i_5 + x^3 \cdot i_4 + x^2 \cdot i_3 + x^1 \cdot i_2 + x^0 \cdot i_1 \tag{6}$$

or, in general, by the relationship (7)

$$x^i \bmod G_{KKF}(x), \tag{7}$$

if a "1" is entered for i=0 in the first stage 2 and $E(x)=0$. As from $x^{31}$, the conditions in the individual stages are repeated based on the period of 31 of the $2^5$-m sequence. The content $i_5$ of the register 6 indicates the $2^5$-m sequence or $c_O(n)$ as binary sequence of numbers. If the code word $c_O(n)$ is shifted cyclically in accordance with equation (4) or in accordance with equation (5), one then receives 31 different code words $C(x)$ with respect to their phase s, as can be noted from FIG. 3. These different code words $C(x)$ can be described by the following equation (8):

$$C_s(x) = [x^s \cdot H_{KKF}(x)] \bmod (x^{31}+1) \tag{8}$$

These code words have a length of 31 and make 31 different phase positions "s" of the $2^5$-m sequence possible, so that in this way 31 different codes words are available.

By way of further explanation of equation (8), cyclic codes generally have, as characteristic, an irreducible generator polynomial $G(x)$ with the degree g. Code words $C(x)$ are generally now produced such that the so-called cyclic supplementation $R(x)$ is appended to a data word $D(x)$, so that the code-word polynomial $C(x)$ is divisible by $G(x)$ without remainder. For this purpose, $D(x)$ is first multiplied by $x^g$ and $R(x)$ is then obtained by the division of the product $D(x) \cdot x^g$ by $G(x)$. $R(x)$ has the degree g−1 and is thus precisely g places long. The code words obtained are described by $$C(x) = x^g \cdot D(x) + R(x) \tag{9}$$

this code word is then divisible without remainder by $G(x)$. We therefore have $$\frac{C(x)}{G(x)} = \frac{X^g \cdot D(x) + R(x)}{G(x)} = E(x) \tag{10}$$

from which we obtain $$\frac{x^g \cdot D(x)}{G(x)} = E(x) + \frac{R(x)}{G(x)} \tag{11}$$

and $$R(x) = |x^g \cdot D(x)| \bmod G(x) \tag{12}$$

The cyclic supplementation can now be obtained by inserting a data value for $D(x)$ in equation (12) and dividing it by $G(x)$. The result can then be separated into the result coefficient $E(x)$ and the remainder $R(x)$. Only the result for $R(x)$ in equations (11) and (12) is essential for the calculation of the code word. $E(x)$, on the other hand, is of no importance for the code word.

The store of a total of 31 code words can be doubled by inversion using a bipolar coder such as shown in FIG. 4, thereby obtaining 31 inverse code words. The code-word generator shown here has a feedback-coupled shift register 20 with the generator polynomial $G_1(x)$ with several stages 21 to 24 (a total of 26 stages) and exclusive-OR gates 25 and 26. Another exclusive-OR gate 27 is arranged on an output side of the shift register 20. An input 28 of the exclusive-OR gate 27 is directly coupled to the input of the exclusive-OR member 26 and is adapted to be connected, via a switch contact 29 in its "a" position, to the output of stage 24. In the "b" position of the switch contact 29, the one input 28 is acted on by the signals of the lower five places $d_1$ to $d_5$ of the data word $D(x)$. The further input 30 of the further exclusive-OR member 27 is acted on by the signal of the highest (sixth) place of the data word $D(x)$. The sixth place controls the inversion so that 62 different code words are available here if one furthermore starts from a $2^5$-m sequence as example.

The 62 different code words forming a first code-word supply are thus obtained. Only half of the 62 code words are obtained by means of a code-word generator with the generator polynomial according to equation (5) while the other half of the 62 code words are obtained by inverting the first 31 code words to form inverse code words.

Based on the above, a second code-word supply can be produced by means of a second code-word generator having a generator polynomial $G_2(x)$ and by inverting the code words thus obtained. A third code-word supply can be obtained by means of a third code-word generator having a generator polynomial $G_3(x)$, which polynomials can be described by the following equations (13) and (14):

$$G_2(x) = \frac{x^{31} + 1}{B_3(x)} \tag{13}$$

$$G_3(x) = \frac{x^{31} + 1}{B_5(x)} \tag{14}$$

In these equations (13) and (14), $B_3(x)$ and $B_5(x)$ represent the irreducible polynomials of fifth degree:

$$B_3(x)=x^5+x^4+x^3+x^2+1 \tag{15}$$

$$B_5(x)=x^5+x^4+x^2+x+1 \tag{16}$$

In the table of FIG. 5, the code word supply $C(x)$ produced with the bipolar code in accordance with FIG. 4 is described by indication of the generator polynomial $G_1(x)$ with reference to the inversion, where "b" indicates either "0" or "1". The second code-word supply is characterized in the table by indication of the generator polynomial $G_2(x)$, while $G_3(x)$, with the additions a to d, designates code words of the third code-word supply.

As can furthermore be noted in detail from FIG. 5, in this way data words $D(x)$ can be coded as test data to be transmitted which represent 7-bit words with the binary places $d_1$–$d_7$. In this connection, one proceeds such that a shortened data word $D_k(x)$ of the fifth order is obtained, in each case, from the data words $D(x)$ of the seventh order, it having the five lowest places of the data word $D(x)$ of seventh order. Inverted or non-inverted code words of the one code-word supply and of the further code-word supply are associated with this shortened data word $D_k(x)$ of fifth order as a function of the combination of values at places $d_6$ and $d_7$ of the data word $D(x)$ of seventh order. In this way, a total of 124 different test data can be coded. Therefore, four additional code words are still lacking to be able to transmit test data of a length of 7 bits. These additional code words are obtained such that two noninverted code words of the generator polynomial $G_3(x)$ and the inverse code words from an additional code-word supply are used for this, again as a function of the combination of values $d_6$ and $d_7$. Thus a total of 128 code words are available, so that data words of a width of 7 bits can be transmitted.

As shown in FIG. 6, the code words formed by means of the above-described code-word generators with the generator polynomials $G_1(x)$, $G_2(x)$ and $G_3(x)$ are deposited in a coding device 40, which may be an addressable memory. In this connection, the code words produced in accordance with the generator polynomial $G_1(x)$ are present, for instance, at storage positions 41 the inverse code words of which are present on storage positions 42, and the code words produced in accordance with the generator polynomial $G_2(x)$ are present at storage positions 43, the inverse code words at storage positions 44 and the additional code words at storage positions 45 and their inverse code words at storage positions 46. Data words shown in block 47 which are to be coded are coded in the coding device 40 in a manner such as described above and transmitted as coded data (block 48) over a transmission path 49 where they are present as coded data (block 50). The coded data in block 50 includes any errors introduced by the transmission path 49. The coded data are fed to three cross-correlators 51, 52 and 53.

The cross-correlators 51 to 53 have different $2^5$-m sequences as correlation references:

$$M_1(x)=x^{26}+x^{26} \bmod G_1(x) \tag{17}$$

$$M_2(x)=x^{26}+x^{26} \bmod G_2(x) \tag{18}$$

$$M_3(x)=x^{26}+x^{26} \bmod G_3(x) \tag{19}$$

These correlation references are produced with the generator polynomials $G_1(x)$, $G_2(x)$ and $G_3(x)$. The cross-correlator 51 thus has the correlation reference $M_1(x)$, the cross-correlator 52 has the correlation reference $M_2(x)$, and the cross-correlator 53 has the correlation reference $M_3(x)$.

If the generator polynomial for the generated code word $C'(x)$ is identical to the correlation reference, then a course of the function with a maximum of the height 31, as shown in FIG. 7, results for the cross-correlation function $KKF(n)$ between the code word and the correlation reference. The value "n", at which the main maximum is detected in the cross-correlation function is associated unambiguously to the phase "s" of the code word received. Furthermore, all considerations with regard to the cross-correlation are made with a bipolar sequence of numbers in which, therefore, in view of equation (4), all "0" values are replaced by the value "–1". For the example, it was assumed that $D(x) = 0$ and $M_1(x)$ is the correlation reference. The code words produced with a given generator polynomial produce an evaluatable maximum with the value 31 only in one of the three cross-correlators. In the two other cross-correlators only smaller maxima are produced, as can be noted from FIG. 8. In this connection, the unambiguity of the maximum in the plot of $KKF_1(n)$ is true also for falsified code words (i.e., code words including transmission errors). The value of the main maximum in $KKF_1(n)$ drops by the value 2 per bit error in the code word. At the same time the maximum values of the secondary maxima in $KKF_2(n)$ and $KKF_3(n)$ increase at most by 2 per bit error in the code word. To obtain a maximum error tolerance upon the correlative decoding, the recognition threshold for a maximum in the course of the function of the cross-correlation is set at $$|KKF(n)| \leq 21$$

This means that the code words transmitted can have up to 5 bit errors and still be recognized correctly.

From the position of the main maximum, from the polarity of the main maximum (positive or negative), and from the cross-correlator which provides the main maximum, the data word $D(x)$ can be directly determined by means of a memory following the cross-correlators 51–53 (not shown), using the table shown in FIG. 5. In this connection, upon the occurrence of a positive main maximum in the cross-correlator 51 with the correlation reference $M_1(x)$ it is determined that $C(x)$ has been generated with $G_1(x)$. In this way, in accordance with FIG. 5, places $d_6$ to $d_1$ of the data word $D(x)$ are determined as 0. The position of the main maximum is now determined by the value of $d_7$.

In the same way as in the known process which was described at the beginning hereof, the number of bit errors can be determined in suitable manner by also evaluating the height of the main maximum in the process of the present invention.

Furthermore, the process of the present invention is not limited to the use of $2^5$-m sequences as code words but that the Barker code, the Gordon Mills and Welsh sequence, and the Gold code can also be used.

The process of the present invention is not limited to the use of code words of a given length, a given number of cross-correlators, or a given number of generator polynomials. However, the number of cross-correlators must agree with the generator polynomials.

I claim:

1. A process for recovering, at a reception end, data transmitted over a transpission path for digital data steams from a transmission end to the reception end, in which various data are coded at the transmission end of the transmission path using a first code word generated by a first code-word generator, which can be described by a generator polynomial of degree five, an autocorrelation of said first code word producing a Dirac pulse and also using a first plurality of additional code words, including a first subset of code words generated by the first code-word generator by cyclic shifting of the first code word and including a first subset of inverted code words obtained by inverting the first subset of code words, and in which a cross-correlation of a code word received in each case is performed at the reception end of the transmission path for decoding by means of a first cross-correlator, using a relative position and a sign of a main maximum of a corresponding cross-correlation function for recovery of the data, said process comprising the steps of: using a second plurality of code words at the transmission end, a first additional code word of the second plurality of code words being generated by a first additional code-word generator, and an autocorrelation of the first additional code word produces a Dirac impulse, said second plurality of code words including a second subset of code words generated from the first additional code word by cyclic shifting of said first additional code word and also including a second subset of inverted code words obtained by inverting the second subset of code words, wherein the first additional code-word generator is describable by a generator polynomial $(G_2(x))$ of a same degree as that of the first code-word generator, coding a first set of data $(D(x))$ with data polynomials of a seventh degree so that code words $(G_1(x)$ not inverted; $G_2(x)$ not inverted) from the first and first additional code-word generators are associated with data polynomials $(D_K(x))$ formed therefrom having in each case the five lowest binary places of a data polynomial $(D(x))$ of the seventh degree, as a function of two combinations of values of the two highest binary places $(d_6, d_7)$ of the data polynomial $(D(x))$ of seventh degree, coding a second set of data $(D(x))$ with data polynomials of a seventh degree so that the first and second subset of inverted code words $(G_1(x)$ inverted; $G_2(x)$ inverted) from the first and first additional code-word generators, respectively, are associated with data polynomials $(D(x))$ formed therefrom having in each case the five lowest $(D(x))$ formed therefrom having in each case the five lowest binary places of the data polynomial of seventh degree, as a function of two further combinations of values of the two highest binary places $(d_6, d_7)$ of the data polynomial $(D(x))$ of seventh degree, and coding a third set of data with data polynomials of a seventh degree so that code words $(G_3(x);$ a, b, c, d) of an additional code-word supply are associated with data polynomials formed therefrom each having a null at the five lowest binary places $(d_1-d_5)$ of the data polynomial $(D(x))$ of seventh degree, as a function of four combinations of values of the two highest binary places $d_6$, $d_7$, of the data polynomial $(D(x))$ of seventh degree wherein the additional code-word supply is produced by a second additional code-word generator which agrees with the first and first additional code-word generators with respect to a degree of its generator polynomial $(G_3(x))$ and its code words, forming three cross-correlation functions on the reception end by means of a first additional cross-correlator and a second additional corss-correlator having different correlation references $(M_2(x), M_3(x))$, which are examined as to a height of their main maxima, and if a height of a main maximum lies above a value predetermined in view of maximum fault tolerances in decoding, its relative position is determined and datum transmitted ine ach case is recovered therefrom with due consideration of a sign of the corresponding main maximum.

2. The process according to claim 1, wherein for coding of the third set of data $(D(x))$, in addition to code words $(G_3(x);$ a, c) of the additional code-word supply, code words $(G_3(x);$ b, d) formed by their inversion are used.

3. A process according to claim 1, wherein the height of the main maxima of the corss-correlation functions $(KKf(n))$ is utilized as measure of a number of bit errors.

4. In a system having a transmission path for digital data streams, the transmission path having a transmission end and a reception end, a process for recovering, at the reception end, a data block transmitted over the transmission path, the process for recovering comprising steps of:

a) generating a first group of binary code words comprising substeps of:
  i) generating, with a code word generator, a binary code word having an auto-correlation function that produces a Dirac pulse, wherein the code word generator can be described by an n-degree generator polynomial;
  ii) cyclically shifting the code word generated in step (a)(i) to generate further binary code words;
  iii) inverting the binary code word generated in step (a)(i) and the further binary code words generated in step (a)(ii) to generate still further binary code words;

b) generating a second group of binary code words comprising sub-steps of:
  i) generating, with a second code word generator, a second binary code word having an auto-correlation function that produces a Dirac pulse, wherein the second code word generator can be described by an n degree generator polynomial;
  ii) cyclically shifting the second binary code word generated in step (b)(i) to generate further second binary code words;
  iii) inverting the second binary code word generated in step (b)(i) and the further second binary code words generated in step (a)(ii) to generate still further second binary code words;

c) coding the data block, at the transmission end of the transmission path, by means of the binary code word generated in step (a)(i), the further binary code words generated in step (a)(ii), the still further binary code words generated in step (a)(iii), the second binary code word generated in step (b)(i), the further second binary code words generated in step (b)(ii), and the still further second binary code words generated in step (b)(iii), including sub-steps of:
  i) coding a number of data of the data block with seven degree data polynomials having five lowest binary places and two highest binary places such that the binary code word of the first code word generator and the second binary code word of the second binary code word generator are associated with data polynomials formed therefrom having, in each case, the five lowest binary places of the seven degree data polynomial, as a function of two combinations of values of the two highest binary places of the seven degree data polynomial;
  ii) coding a further number of data of the data block with seven degree data polynomials having five lowest binary places and two highest binary places such that the inverted code words and the second inverted code words are associated with data polynomials formed therefrom having, in each case, the five lowest binary places of the seven degree data polynomial, as a function of two further combinations of values of the two highest binary places of the seven degree data polynomial; and
  iii) coding an additional number of data with seven degree data polynomials having five lowest binary places and two highest binary places such that code words of an additional code word supply, being produced by a third n-degree code word generator, are associated with data polynomials formed therefrom, each having a null at the five lowest binary places of the seven degree data polynomial, as a function of four combinations of values of the two highest binary places of the seven degree polynomial;
d) cross-correlating the code word at the reception end of the transmission path with a first cross-correlator having a first correlation reference to obtain a first main maximum, with a second cross-correlator having a second correlation reference to obtain a second main maximum, and with a third cross-correlator having a third correlation reference to obtain a third main maximum, each of the first, second, and third main maximums having a relative position and a sign;
e) determining whether any of the first, second, and third main maximums exceed a predetermined value; and
f) recovering the data block using the relative position and the sign of any of the first, second, and third main maximums which exceed the predetermined value.

5. The process of claim 4 wherein the step of (c)(iii) further includes steps of:
  inverting the code words of the additional code word supply; and
  using the inverted code words for coding the additional number of data.

6. The process of claim 5 further comprising a step of determining a number of bit errors based on a height of at least one of the first, second, and third main maximums.

* * * * *